United States Patent
Revilla et al.

(10) Patent No.: US 11,506,575 B2
(45) Date of Patent: Nov. 22, 2022

(54) SYSTEMS AND METHODS FOR PROBABILISTIC AND DETERMINISTIC BOILER NETWORKS

(71) Applicant: Rheem Manufacturing Company, Atlanta, GA (US)

(72) Inventors: Jorge Miguel Gamboa Revilla, Oxnard, CA (US); Sergio Montalgo Salazar, Oxnard, CA (US); Amin Monfared, Oxnard, CA (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 271 days.

(21) Appl. No.: 16/838,568

(22) Filed: Apr. 2, 2020

(65) Prior Publication Data
US 2021/0310904 A1 Oct. 7, 2021

(51) Int. Cl.
  *G01M 99/00* (2011.01)
  *G05B 23/02* (2006.01)

(52) U.S. Cl.
  CPC ....... *G01M 99/005* (2013.01); *G05B 23/0227* (2013.01); *G05B 23/0275* (2013.01); *G05B 23/0289* (2013.01)

(58) Field of Classification Search
  CPC ............ G01M 99/005; G05B 23/0227; G05B 23/0275; G05B 23/0289
  See application file for complete search history.

(56) References Cited

U.S. PATENT DOCUMENTS

| | | | |
|---|---|---|---|
| 6,227,842 B1 | 5/2001 | Lemelson et al. | |
| 6,468,069 B2 | 10/2002 | Lemelson et al. | |
| 2019/0025812 A1* | 1/2019 | Cella | G06N 3/084 |

FOREIGN PATENT DOCUMENTS

| | | |
|---|---|---|
| RU | 2504006 C1 | 1/2014 |
| RU | 2715302 C1 | 2/2020 |

* cited by examiner

*Primary Examiner* — Manuel A Rivera Vargas
(74) *Attorney, Agent, or Firm* — Eversheds Sutherland (US) LLP (57) ABSTRACT

Systems and methods for boiler regulation are disclosed. The system can receive boiler data from a boiler and compare the boiler data to a normal operating range to detect an abnormality. Based on a plurality of rules, the system can identify an anticipated root cause and at least one corrective action. Based on the at least one corrective action, the system can generate and/or output instructions for the boiler to perform the at least one corrective action. The system can display an indication of the abnormality and/or the at least one corrective action.

20 Claims, 5 Drawing Sheets

| ABNORMALITY | ROOT CAUSE | CORRECTIVE ACTION |
|---|---|---|
| temperature data indicates that the difference between the inlet and outlet is too small | excessive flow condition, exceeding boiler heat design capacity | consider redundant heat source, device is potentially dimensioned for the application. Reduce flow through the heat exchanger |
| temperature data from temp sensor at flue is above a predetermined threshold | high temperatures at flue gases | consider heat exchanger maintenance, possible damage or blockage on HX tubes; increase water flow; and/or verify water flow circulation |
| rate of change for flow rate data is above a predetermined threshold for a predetermined amount of time | rapid flow changes | output instructions to measure an amount of flow of a pump and/or to determine whether a pipe is blocked |
| temperature difference between inlet and outlet of the boiler above a predetermined threshold for a predetermined amount of time | increased flow variations | output instructions to check the boiler pump and/or the pump contactor; and/or consider boiler tune up, possibly over firing unit |
| rate of change for oxygen data is above a predetermined threshold for a predetermined amount of time | fluctuations of oxygen levels | output instructions to perform an overall combustion check; and/or output notification that system is running with low fuel content and/or combustion is out of tune |
| outlet temperature rate of change is above a predetermined threshold for a predetermined amount of time | bad system pipe install and/or defective cold water protection system | output instructions to check at least one of: a system pipe install, a defective circulation system, or a boiler pump |
| multiple ignition attempts are ineffective | weak flame current or flame rectification | output instructions to check gas valve, flame sensor integrity, gas valve filter, an igniter, and/or a hot surface igniter (HSI) component |

SYSTEMS AND METHODS FOR PROBABILISTIC AND DETERMINISTIC BOILER NETWORKS

FIELD OF INVENTION

Examples of the present disclosure relate to systems and methods for probabilistic and deterministic networks, and more particularly to systems and methods for determining boiler abnormalities and providing proactive and/or reactive corrective actions.

BACKGROUND

Boilers are often composed of various subcomponents including burners, heat exchangers, supply lines, return lines, fireboxes, pumps, condensers, deaerators, and other devices. Each of these subcomponents may generate data associated with its respective performance. However, this data is often segregated by component, which makes it difficult to understand the overall performance of the boiler system. Further, this data is usually evaluated after a boiler malfunction.

Accordingly, there is a need for systems and methods that realize aspects of various components and subcomponents of a boiler to proactively predict boiler abnormalities to perform corrective actions to prevent or mitigate a boiler malfunction. Examples of the present disclosure are directed to this and other considerations.

SUMMARY

Examples of the present disclosure comprise systems and methods for probabilistic and deterministic networks. The disclosed technology includes a system that can include one or more processors, a transceiver, a memory, and/or a display. The system can receive boiler data from a boiler that collects the boiler data from a plurality of boiler subcomponents. The system can also receive stored historical data (e.g., previous data from one or more boilers) and be configured to apply a plurality of rules. The system can detect an abnormality using a plurality of rules. The system can be configured to determine an abnormality exists if at least some of the boiler data is below a predetermined similarity threshold with respect to the historical data. To determine the similarity, the system can compare received boiler data to a normal data range that is based at least in part on the stored historical data and can determine whether at least a predetermined amount of the boiler data is within the normal data range. If at least the predetermined amount of the boiler data is within the normal data range, the system can determine that no abnormality exists. If less than the predetermined amount of the boiler data is within the normal data range (i.e., more than a permissible amount of the boiler data is outside the normal data range), the system can determine that an abnormality exists. Based on a comparison of the boiler data to the plurality of rules (e.g., the type of boiler data, a subcomponent typically associated with the type of boiler data, the amount of boiler data outside of the normal data range, the magnitude of the difference between the boiler data and the normal data range), the system can identify a particular abnormality associated with the boiler data. Based on the abnormality and/or the rules, the system can identify at least one subcomponent of the boiler associated with the abnormality. Using the rules, the system can determine at least one corrective action for the abnormality. The system can generate or determine instructions based on the at least one corrective action and can output the instructions for the boiler to perform the at least one corrective action. Optionally, the system can indicate, via the display, the abnormality and/or the at least one corrective action on.

The disclosed technology includes a plurality of rules. Each rule can associate a given abnormality with an anticipated root cause and at least one corrective action to remedy or correct the anticipated root cause.

Further, each of the rules can have a respective weighted value. For example, each of the rules can have the same initial weighted value, or the initial weighted value can vary depending on the rule. Regardless, subsequent to performing the corrective action (e.g., after the at least one corrective action has been performed, after instructions to perform the at least one corrective action have been sent and the corrective action has been performed), the system can determine a status of the abnormality (i.e., whether the abnormality is corrected or uncorrected). For example, the system can send a request for additional boiler data to the boiler; receive the additional boiler data from the boiler; and compare the additional boiler data to the stored historical data to determine whether the additional boiler data is whether at least a predetermined amount of the additional boiler data is within the normal data range.

The system can be configured to update the plurality of rules based on the status of the abnormality. For example, in response to determining the abnormality is corrected, the system can assign an increased weighted value to the corresponding rule (i.e., the rule including the previously performed corrective action). Additionally or alternatively, in response to determining the abnormality is not corrected, the system can assign a decreased weighted value to the corresponding rule. Stated otherwise, rules leading to a corrected status can be updated to have an increased weighted value, and conversely, rules leading to an uncorrected status can be updated to a decreased weighted value.

In some examples, the system can determine that the boiler did not perform the at least one corrective action and, in response, can output or transmit a boiler override command for the boiler to shut off power to the at least one subcomponent.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings:

FIG. 4 illustrates a table diagram of a plurality of example rules, in accordance with the disclosed technology.

DETAILED DESCRIPTION

Examples of the present disclosure relate to systems and methods for boiler regulation. The system can receive boiler data and identify an abnormality, which can be indicated by one or more types of boiler data that are outside a normal data range for each corresponding type of data. The system can identify abnormalities based on comparisons of the boiler data to historical data. Based on the type of boiler data outside the normal range(s), the magnitude(s) by which the data is outside the normal range(s), and a plurality of rules, the system can identify an anticipated root cause (i.e., a problem that is likely or most likely to be the cause of the abnormality) associated with the abnormality. The plurality of rules can also associate one or more corrective actions with each abnormality and associated anticipated root cause. Based on the corresponding corrective action(s), the system can generate and/or output instructions for performance of one or more tasks to be completed by the boiler or one or more components of the boiler and/or for transmission of a notification to one or more user devices. When the boiler or corresponding boiler component receives the instructions, the boiler or corresponding boiler component can perform the corrective action(s). The system can, alternatively or in addition, display an indication of the abnormality and the corrective action(s) (e.g., via a display, via a graphical user interface).

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein can include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to examples of the disclosed technology, examples of which are illustrated in the accompanying drawings and disclosed herein. Wherever convenient, the same references numbers will be used throughout the drawings to refer to the same or like parts.

Figure 1:
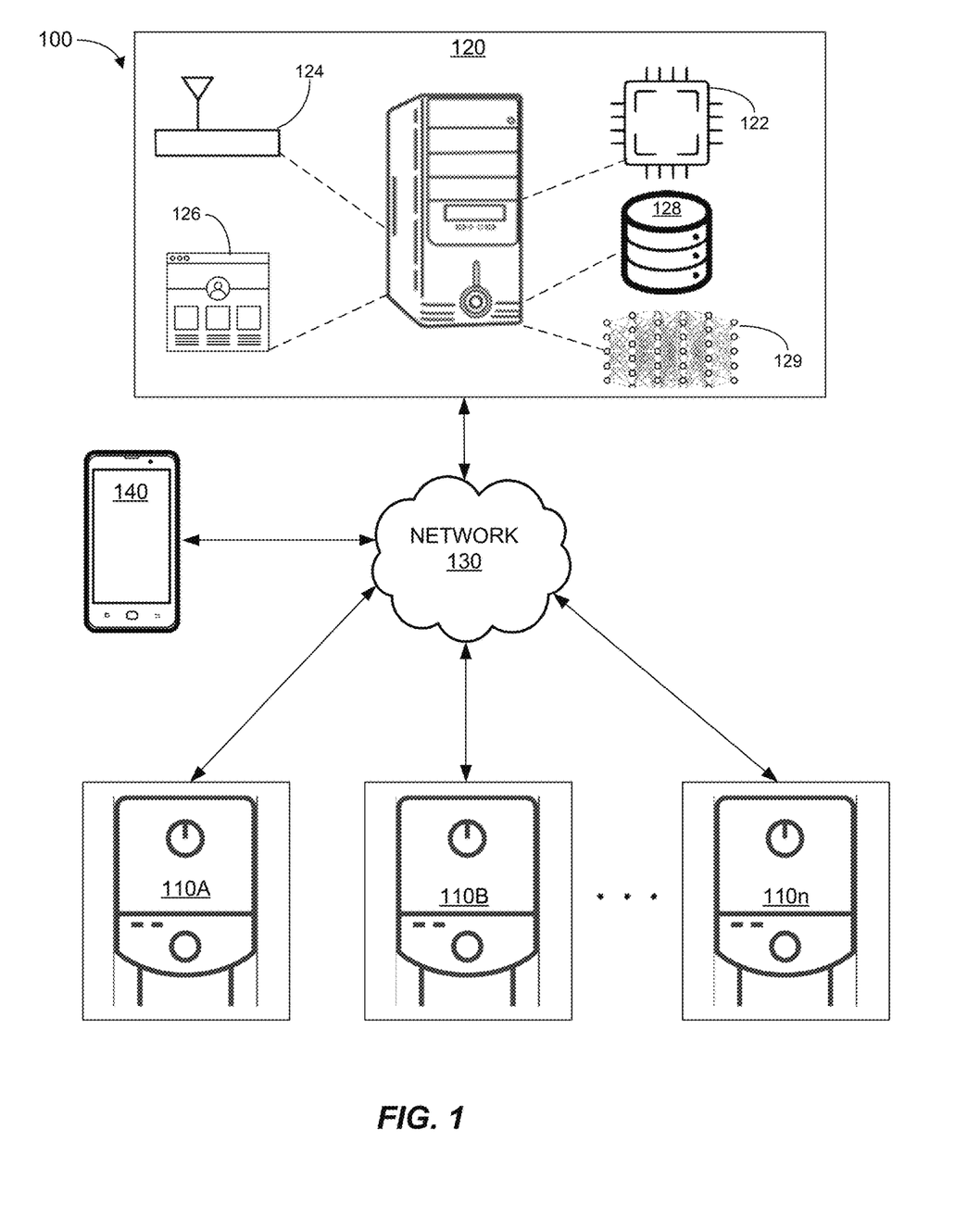
FIG. 1 illustrates a diagram of an example system, in accordance with the disclosed technology.

FIG. 1 shows an example system 100 that can implement certain methods for boiler regulation as disclosed herein. As shown in FIG. 1, the system 100 can include one or more boilers 110A-110n, a user device 140, and a computing device 120, which can include one or more processors 122, a transceiver 124, a display 126 (which can provide, for example, a graphical user interface), a database 128, and/or a neural network 129, among other things. The computing device 120 can be a cloud computing device and/or an external server that is in communication with the user device 140 and/or one or more of the boilers 110A-110n. The computing device 120 can include one or more physical or logical devices (e.g., servers) or drives and can be implemented as a single server, a bank of servers (e.g., in a "cloud"), run on a local machine, or run on a remote server. The neural network 129 can be a recurrent neural network (RNN), a convolutional neural network (CNN), or other type of neural network, or other type of machine learning. The user device 140 can be, for example, a personal computer, a smartphone, a laptop computer, a tablet, a wearable device (e.g., smart watch, smart jewelry, head-mounted displays, etc.), or other computing device. The network 130 can include a network of interconnected computing devices (e.g., the Internet, a local network). The one or more boilers 110A-110n can be commercial boilers and/or residential boilers. That is, all of the boilers 110A-110n can be commercial boilers, all of the boilers 110A-110n can be residential boilers, or the group of boilers 110A-110n can include both residential and commercial boilers. An example architecture that can be used to implement the one or more boilers 110A-110n is described more fully below with reference to FIG. 5.

To implement boiler regulation, the computing device 120 can receive boiler data from one or more of the boilers 110A-110n. The boiler data can include a subcomponent identifier for each subcomponent of the boiler (e.g., an identifier for blower 522) as well as a unique identifier for the boiler (e.g., a unique identifier for boiler 110A). The boiler data can further include various attributes and characteristics measured by certain subcomponents such as, for example, air pressure, oxygen levels, air flow changes, and system temperature. The computing device 120 can be configured to compare the boiler data to stored historical data. The computing device 120 can be configured to compare each type of the boiler data (e.g., oxygen data, flow rate data, temperature data) to a corresponding type of stored historical data (e.g., historical oxygen data, historical flow rate data, historical temperature data). To predict, for example, that the boiler 110A is likely to incur a boiler malfunction (e.g., pump malfunction, flame current sensor malfunction, and/or improper flue gas levels) the computing device 120 can compare the received boiler data to stored historical data (or a normal operating range that is based at least in part on stored historical data) to detect an abnormality. The computing device 120 can be configured to determine a normal operating range (e.g., based on stored historical data), which indicates a normal operating status, for some or all of the various types of sensors, components, and/or subcomponents of the boiler 110A-110n. The computing device 120 can be configured to determine whether a predetermined amount of the boiler data (e.g., at least 80%, at least 90%, at least 95) is within the corresponding normal operating range. The predetermined amount can be the same for all types of boiler data, or the predetermined amounts can differ for some or all of the different types of boiler data. Thus, for one or more given components, if at least the predetermined amount the received boiler data is within the normal operating range, the computing device 120 can be configured to determine that the boiler data indicates the boiler 110A, or the corresponding component(s) or subcomponent(s), is operating normally. In contrast, if less than the predetermined amount of the received boiler data for a given sensor, component, and/or subcomponent is outside the predetermined range of values, the computing device 120 can determine that an abnormality exists, which can indicate that the corresponding boiler 110A-110n is likely to incur a boiler malfunction.

The computer device 120 can determine, based on the type and severity of abnormality and/or the boiler data itself, a corresponding corrective action. The "severity" of an abnormality, as used herein, refers to the amount of boiler data that is outside the normal operating range and/or the magnitude of the difference between the received boiler data for a given sensor, component, and/or subcomponent and the nearest endpoint of the corresponding normal operating range (e.g., if the received boiler data includes sensor values that are less than a predetermined range of values, the nearest endpoint of the predetermined range of values is the lower endpoint, if the received boiler data includes sensor values that are greater than the predetermined range of values, the nearest endpoint of the predetermined range of values is the upper endpoint).

Based on at least the type and/or severity of the abnormality and/or a plurality of rules (see, e.g., FIG. 4), the computing device 120 can be configured to determine an anticipated root cause. The computing device 120 can be configured to determine the anticipated root cause based on other information, as well. For example, the computing device 120 can be configured to determine the anticipated root cause based on whether instructions have been previously sent to one or more particular components (e.g., whether a burner was instructed to increase heat output), whether one or more particular components currently have power, and/or whether one or more particular components are outputting corresponding data.

Associations between the type and severity of abnormalities, anticipated root causes, and associated corrective actions can be stored in memory of the computing device 120 as a plurality of rules (e.g., as shown in FIG. 4). The plurality of rules can be generated or defined by the neural network 129, and the neural network 129 can be configured to update, refine, and/or revise the rules. The neural network 129 can receive additional or subsequent boiler data (i.e., subsequent to a corrective action being performed) from the sensor(s), component(s), and/or subcomponent(s) associated with a given corrective action. Based on the subsequent boiler data, the neural network 129 can modify (e.g., update, refine, and/or revise) a given corrective action based on the accuracy of the anticipated root cause, and then the updated corrective action can then be provided and/or executed when a similar abnormality is later detected. Stated otherwise, the neural network 129 can be configured to monitor boiler data following a corrective action to determine the efficacy of that corrective action and can continuously update, refine, and/or revise the rules to ensure the corrective actions that are most likely to remedy the detected abnormalities are provided and/or executed. Similarly, the weight value of a given rule can be increased or decreased, as discussed further herein.

As a more specific example, the computing device 120 can receive boiler data associated with the boiler 110A and compare the received boiler data to a normal operating range that is based at least in part on stored historical data, which can be historical data associated with one or more boilers (e.g., boilers 110B-110n). The boilers can be boilers of the same type, make, and/or model; boilers located in the same climate or environment; boilers in similar climates or environments; boilers having similar operating parameters or characteristics; or any other useful grouping of boilers. The computing device 120 can further determine which subcomponent(s) is associated with the abnormality. In some cases, determining the subcomponent associated with the abnormality can be based at least in part on the plurality of rules.

Based on the plurality of rules, the computing device 120 can determine a corrective action to fix or correct the anticipated root cause associated with the abnormality. The Determining the corrective action can include comparing the abnormality to the plurality of rules to determine at least a partial match between the detected abnormality (i.e., associated with the boiler data) and a known abnormality from the plurality of rules. Matching the detected abnormality to the known abnormalities can include identifying a weight score associated with each of the known abnormalities of the plurality of rules. As discuss more fully herein, the weight value of a given rule can be indicative of the past efficacy for the rule. That is, the weight value can indicate whether the corrective action(s) of a given rule successfully fixed or corrected the associated abnormality. Based on the similarities between the detected abnormality and the known abnormalities, as well as the weight value for each rule, the computing device 120 can computing a matching score. The computing device 120 can be configured to select the rule having the highest matching score. Alternatively, instead of calculating a matching score, the computing device 120 can be configured to select the rule having weight value from among all rules that include a known abnormality that is above a predetermined similarity threshold with respect to the detected abnormality.

Based on the corrective action(s) associated with a given rule, the computing device 120 can generate instructions and output the instructions for performance by the boiler 110A or a component or subcomponent thereof. The instructions can be executable code, for example, that when received by the boiler 110A (or a component or subcomponent of boiler 110A), causes the boiler 110A (or a component or subcomponent of boiler 110A) to perform the corrective action. Alternatively or in addition, the instructions can cause the boiler 110A to display text, an image, or another indicator indicative of the abnormality and/or the corrective action (e.g., via a display of the boiler 11A). If the corrective action includes replacing a component or subcomponent, the instructions can cause the boiler 110A (or the computing device 120 itself) to automatically place an order for the replacement component or subcomponent for delivery to a known location of the boiler 110A. If the corrective action includes the involvement of a technician (e.g., inspection, manual adjustment), the instructions can cause the boiler 110A (or the computing device 120 itself) to automatically schedule or automatically facilitate scheduling of a technician appointment. To automatically facilitate scheduling of a technician appointment, the boiler 110A (or the computing device 120) can identify one or more technicians known to provide services in an area including the location of the boiler 110A; determine availability of the one or more technicians (e.g., by referencing a schedule for each of the one or more technicians); determine availability of an owner, operator, or other custodian of the boiler 110A (e.g., by referencing a calendar of the owner, operator, or other custodian); identify one or more windows of availability shared by the one or more technicians and the owner, operator, or custodian of the boiler 110A; select one of the one or more available technicians (e.g., randomly, selecting the highest ranked available technician according to a rating or review system); and submit a request to the selected technician to schedule a technician appointment at the identified window of availability. Alternatively or in addition, based on the corrective action(s), the computing device 120 can transmit a notification to a user device 140, and the notification can include instructions, reminders, alerts, alarms, or any other information that may be useful for a given corrective action.

While not exhaustive, some examples of rules are shown in FIG. 4. For example, a first rule can include an abnormality associated with temperature data that indicates the difference between an inlet temperature and an outlet temperature is least a predetermined amount less than an anticipated temperature difference based on current burner settings. The first rule can associate this abnormality with an anticipated root cause of excessive flow condition and/or excessive boiler heat design capacity, and the first rule can include a corrective action that includes transmitting a notification to a user device. The notification can include instructions to consider whether redundant heat source exists or if the device is potentially dimensioned for the application, or to reduce flow through the heat exchanger.

As another example, a second rule can include an abnormality associated with temperature data that indicates the temperature at the flue is above a predetermined threshold. The second rule can associate this abnormality with an anticipated root cause of excessively high temperature flue gases, and the second rule can include a corrective action that includes outputting instructions for the burner to decrease heat output and/or transmitting a notification to a user device. The notification can include instructions to consider heat exchanger maintenance, possible damage, or blockage on HX tubes, increase water flow, and/or verify water flow circulation.

As another example, a third rule can include an abnormality associated with flow rate data that indicates a rate of change in flow rate of water that is above a predetermined change rate threshold. The third rule can associate this abnormality with an anticipated root cause of rapid flow changes, and the third rule can include a corrective action that includes transmitting a notification to a user device. The notification can include instructions to inspect and/or adjust of a pump and/or inspection of one or more pipes for blockages.

As another example, a fourth rule can include an abnormality associated with temperature data that a water temperature differences between the inlet and outlet of the boiler is above a predetermined threshold based on a current heat output of the burner. The fourth rule can associate this abnormality with an anticipated root cause of increased flow variations flow variations, and the fourth rule can include a corrective action that includes transmitting a notification to a user device. The notification can include instructions to inspect and/or adjust the boiler pump or pump contactor, to consider a boiler tune up, and/or to check for an over firing unit.

As another example, a fifth rule can include an abnormality associated with oxygen data that indicates a rate of change in oxygen levels that is above a predetermined change rate threshold. The fifth rule can associate this abnormality with an anticipated root cause of oxygen level fluctuations, and the fifth rule can include a corrective action that includes transmitting a notification to a user device. The notification can include instructions to perform an overall combustion system check and/or to check fuel content.

As another example, a sixth rule can include an abnormality associated with temperature data that indicates a rate of change in outlet temperature that is above a predetermined change rate threshold. The sixth rule can associate this abnormality with an anticipated root cause of one or more incorrectly installed pipes, and the sixth rule can include a corrective action that includes transmitting a notification to a user device. The notification can include instructions to inspect the pipes of the boiler system, to check the circulation system, and/or to check the boiler pump.

As another example, a seventh rule can include an abnormality associated with temperature data that indicates a rate of change in outlet temperature that is above a predetermined change rate threshold. The seventh rule can associate this abnormality with an anticipated root cause of a defective or malfunctioning cold water protection system, and the seventh rule can include a corrective action that includes transmitting a notification to a user device. The notification can include instructions to inspect the cold-water protection system.

As another example, an eighth rule can include a plurality of failed ignition tries. The eighth rule can associate this abnormality with an anticipated root cause of a weak flame current and/or flame rectification, and the eighth rule can include a corrective action that includes transmitting a notification to a user device. The notification can include instructions to inspect one or more gas valves, flame sensor integrity, a gas valve filter, an igniter, and/or a hot surface igniter component.

As another example, a ninth rule can include an abnormality associated with oxygen levels being below a predetermined threshold. The ninth rule can be associated this abnormality with an anticipated root cause of an improperly opened or closed shutter, and the ninth rule can include a corrective action that includes outputting instructions for a shutter to adjust (toggle between opened and closed positions).

After sending the instructions (or otherwise initiating performance of the corrective action(s)), the computing device 120 can determine a status of the abnormality. That is, the computing device 120 can determine if the abnormality has been corrected or if the abnormality remains uncorrected. To determine the status of the abnormality, the computing device 120 can transmit a request to the boiler 110A for additional boiler data and/or can receive the additional boiler data. The computing device 120 can analyze the additional boiler data to determine whether the abnormality still exists (i.e., whether the abnormality has been corrected). Upon determining the abnormality has been corrected, the computing device 120 can update, refine, or revise the rules. As previously mentioned, each rule can have an associated weight value, which can be indicative of a confidence in the associated corrective action being the correct "fix" to a given abnormality. Thus, if multiple corrective actions are determined to be a possible fix to an abnormality, the system can prioritize the rule with the higher weight. Initially, each rule can be assigned an initial weight value, which can be the same for all rules. A selected rule (i.e., a rule for which the corrective action(s) was performed) for which the corrective action(s) corrected the abnormality can be assigned a higher weight than an initially assigned weight (e.g., the previous weight can be increased a predetermined amount, the previous weight can be increased a variable amount that is based on how much the similarity of the boiler data to historical data increased following performance of the corrective action), which can be indicative of a strong correlation between the abnormality, the anticipated root cause, and the corrective action. Conversely, when the selected rule does not lead to the abnormality being corrected, the selected rule can be assigned a lower weight (e.g., the previous weight can be decreased a predetermined amount, the previous weight can be decreased a variable amount that is based on how much the similarity of the boiler data to historical data increased or decreased following performance of the corrective action), which can indicate that the correlation between the abnormality, the anticipated root cause, and the corrective action is not as strong as previously determined. As mentioned above, the computing device 120 can perform these updates recursively, such that the rules are continuously updated and refined.

The computing device 120 can determine whether the boiler 110A (or a component or subcomponent of boiler 110A) has performed the corrective action. When the computing device 120 determines that the boiler 110A (or a component or subcomponent of boiler 110A) did not perform the corrective action, the computing device 120 can send a boiler override to the boiler 110A. The boiler override can include instructions (e.g., executable instructions) that causes the boiler 110A to shut off or disengage at least one subcomponent (e.g., the subcomponent(s) associated with or influenced by the abnormality). This can, for example, prevent damage or additional damage to a given component from occurring.

Figure 5:
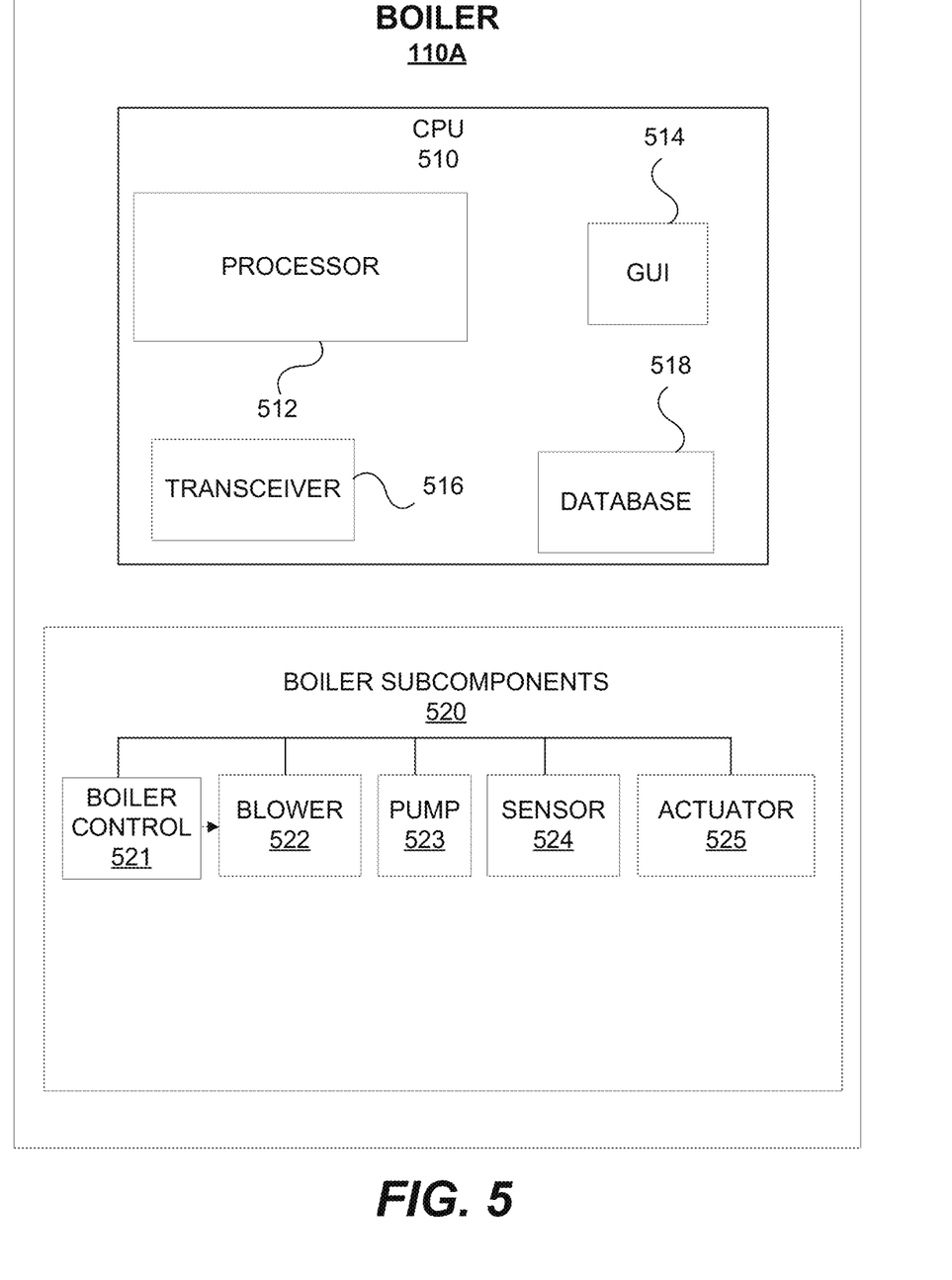
FIG. 5 illustrates a component diagram of an example boiler, in accordance with the disclosed technology.

Turning to the one or more boilers 110A-110n and using the boiler 110A as a representative boiler, the boiler 110A can itself predict corrective actions. To do so, the boiler 110A can retrieve or received boiler data from various boiler subcomponents 520. As shown in FIG. 5, the boiler subcomponents 520 can include boiler control 521, blower 522, one or more pumps 523, one or more sensors 524, and/or one or more actuators 525. Using the plurality of rules, the boiler 110A can compare the boiler data to stored historical data to detect an abnormality. The historical data can be stored in a local database 518 (e.g., as shown in FIG. 5) or a remote database, and the plurality of rules can be stored locally or can received from the computing device 120 and/or another external device. Once the abnormality is determined using methods described herein with respect to computing device 120, the boiler 110A can identify at least one boiler subcomponent 520 associated with the abnormality. The boiler 110A can then self-correct and/or perform a corrective action (e.g., reducing combustion), which can proactively prevent a boiler malfunction. Alternatively or in addition, the boiler 110A can transmit a notification to the user device 140, depending on the corrective action(s). After the corrective action is performed, the boiler 110A can further determine the status of abnormality (e.g., whether the corrective action ameliorated the abnormality). Further, as mentioned above with respect to the computing device 120, the boiler 110A can update the plurality of rules based on the status of the abnormality.

A graphical user interface 514 of the boiler 110A (shown in FIG. 5) can display text, an image, or another indicator indicating the abnormality and/or the corrective action (e.g., via a display of the boiler 110). For example, the graphical user interface 514 can display a representation of the subcomponent 520 associated with the abnormality as well as a representation of the abnormality (e.g., a clogged pump), which can facilitate repair. The graphical user interface 514 can be interactive such that a user can enter commands from the graphical user interface 514, and the user-inputted commands can cause the boiler 110A to perform certain actions.

The system 100 (e.g., boiler 110A) can also be configured to communicate with a user device 140. For example, a residential boiler 110A can be configured to notify a homeowner regarding potential problems or likely malfunctions (e.g., associated with an abnormality) associated with his boiler and/or can provide instructions (e.g., at least one corrective action) to prevent malfunction or damage to the boiler 110A and/or related components or subcomponents. Further features that can be provided from the user device 140 include remote system adjustments, for example, adjusting external and/or internal temperature.

Figure 2:
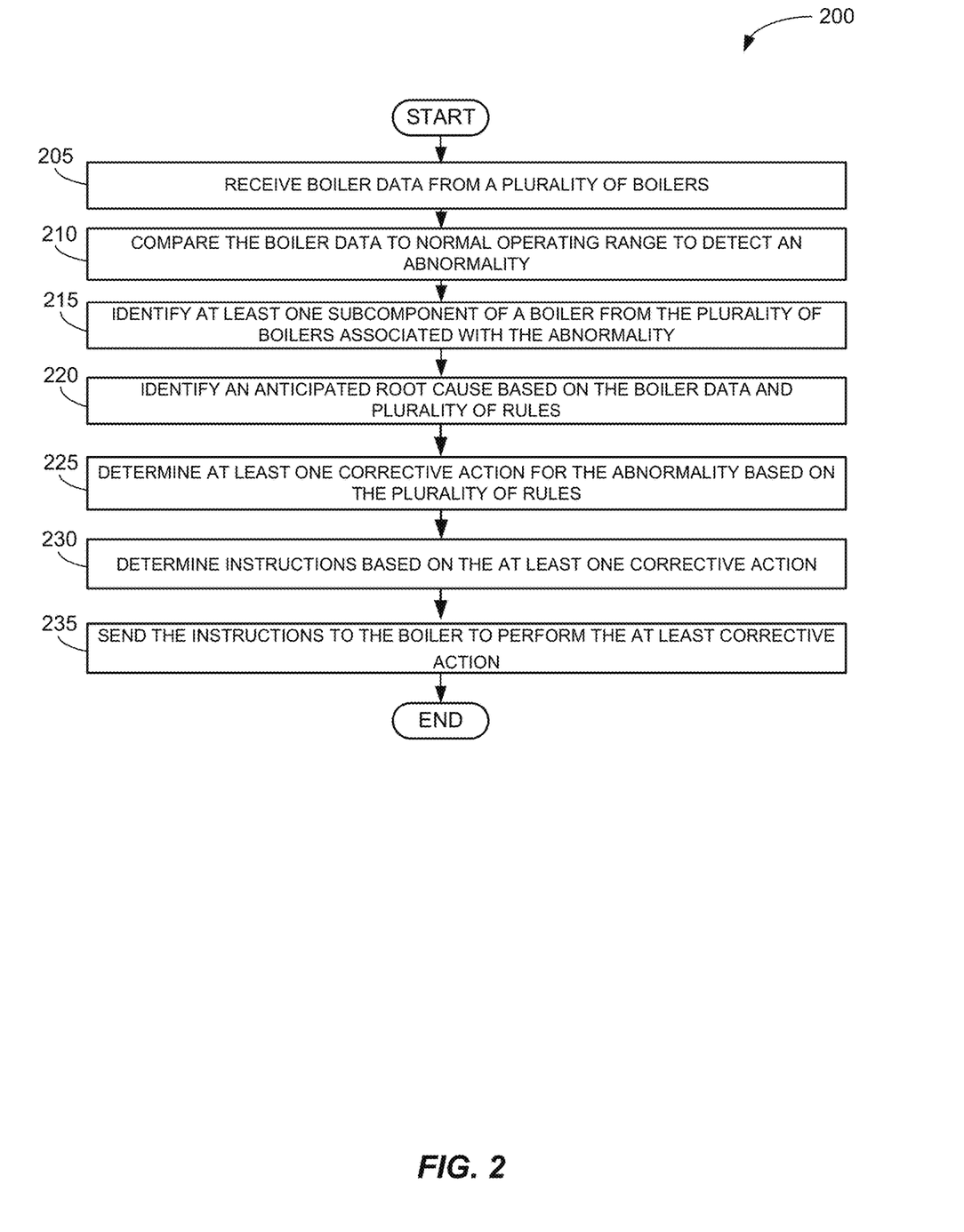
FIG. 2 illustrates a flowchart of an example method for boiler regulation, in accordance with the disclosed technology.

FIG. 2 is a flowchart of an example method 200 for boiler regulation. The method 200 can be performed by the computing device 120, the plurality of boilers 110A-n, the user device 140, or any combination thereof. The computing device 120 can be in wired and/or wireless communication with the user device 140 and/or the plurality of boilers 110A-110n.

At 205, the computing device 120 can receive boiler data from one or more boilers 110A-110n. The boiler data can be an aggregate of boiler data (e.g., a dataset including boiler data associated with a plurality of boilers) received from an external source (e.g., an external server). The boiler data can be associated with various sensors, components, and/or subcomponents of one, some, or all of the boilers 110A-110n, as described herein. The boiler data can include a unique boiler identifier that is indicative of a particular boiler. At 210, the computing device 120 can compare the boiler data to a normal operating range (which can be based at least in part on stored historical data) or the stored historical data itself, and based on that comparison, the computing device 120 can detect an abnormality. To detect an abnormality, the computing device 120 can, as an example, parse the boiler data by boiler and then compare each boiler's respective boiler data to the corresponding normal operating ranges (for each type of boiler data) to determine if at least a predetermined amount of the received boiler data is inside the normal operating range (indicating that the boiler is operating within normal parameters) or if the boiler data is outside the normal operating range (indicating an abnormality exists). At 215, the computing device 120 can identify the boiler (e.g., boiler 110A) having the abnormality, which can be accomplished by identifying the unique boiler identifier. Also, at 215, the computing device 120 can determine at least one subcomponent of the boiler 110A that is associated with the abnormality.

Then, at 220, the computing device 120 can identify an anticipated root cause based on the type of boiler data, the severity of the boiler data, and/or the plurality of rules. At 225, the computing device 120 can determine, based on the plurality of rules, at least one corrective action for the anticipated root cause. Then, at 230, the computing device 120 can determine and/or output instructions based on the at least one corrective action (e.g., instructions to perform the at least one corrective action). At 235, the computing device 120 can send the instructions to the boiler 110A (or a component or subcomponent thereof) to perform the corrective action(s). The instructions can cause the boiler 110A (or a component or subcomponent thereof) to perform the corrective action(s). For example, the instructions can instruct the boiler 110A to reduce the overall combustion, depending on the abnormality and anticipated root cause. Alternatively or in addition, the instructions can include details about an action requiring external execution (i.e., execution by a person or machine external to the boiler 110A), such as replacing a sensor. Alternatively or in addition, the instructions can cause the boiler 110A to display (e.g., on a display) an indication of the corrective action(s) and/or the abnormality (e.g., via a graphical user interface).

Figure 3:
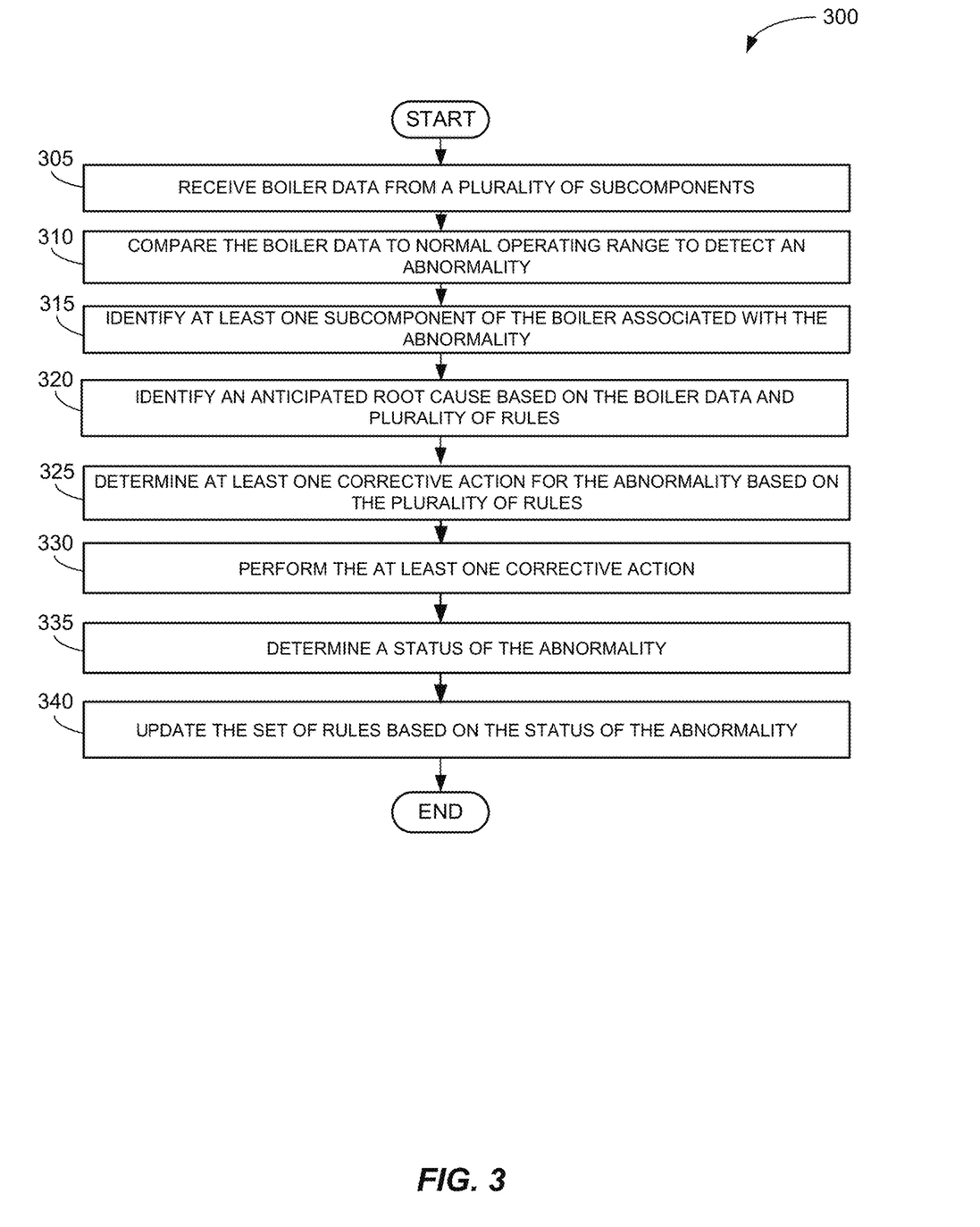
FIG. 3 illustrates a flowchart of an example method for boiler regulation, in accordance with the disclosed technology.

FIG. 3 depicts a flowchart of a method 300 for boiler self-regulation. Therefore, boiler 110A, for example, can regulate itself based on a detected abnormality within its boiler data. Also, to perform the method 300, the boiler 110A can communicate with the computing device 120, the user device 140, and/or an external device.

At 305, the computing device 120 can receive boiler data from a plurality of subcomponents (e.g., subcomponents 520). Each of the subcomponents 520 can be associated with a corresponding type of boiler data. For example, the pump 523 can be associated with measurements of air flow (e.g., air flow data). Also, a given group of subcomponents 520 can be associated with a particular type of boiler data. At 310, the boiler 110A can compare the boiler data to a normal operating range(s) to detect an abnormality, according to the methods and processes described herein. The normal operating range(s) can be based at least in part on historical data, which can include previous boiler data from one or more boilers and can be stored in memory such as, for example, the database 518 (shown in FIG. 5). The previous boiler data can exclusively include data derived from the boiler 110A, or the previous boiler data can include boiler data aggregated from multiple boilers (e.g., boiler 110B and boiler 110C). The boiler 110A can receive the previous boiler data from the other boilers via the transceiver 516 (shown in FIG. 5).

At 315, the boiler 110A can identify at least one subcomponent that is associated with the abnormality, which can be based on the rules, some of which are shown in FIG. 4. Other rules can be dynamically determined based on existing rules that have been generated, revised, and/or updated by the neural network 129. At 320, based on the boiler data and/or rules, the boiler 110A can identify an anticipated root cause. Then, at 325, the boiler 110A can determine at least one corrective action for the abnormality based on the rules. At 330, the boiler 110A can perform the corrective action(s), which can include transmitting or outputting, by the processor 512, instructions to certain subcomponents 520. The instructions can direct the recipient subcomponent 520 to perform one or more tasks for executing the corrective action. At 335, the boiler 110A can determine a status (e.g., corrected or uncorrected) of the abnormality (i.e., the effect of the corrective action on the abnormality). At 340, the boiler 110A can update the plurality of rules based on the status of the abnormality. For example, an identified rule yielding an implemented corrective action that results in a corrected status can be assigned a higher weight, such that the perceived reliability of the rule is increased. Conversely, an identified rule yielding an implemented corrective action that results in an uncorrected status can be assigned a lower weight, such that the perceived reliability of the rule is lessened.

FIG. 4 illustrates a table diagram of a plurality of rules, which can be included as part of a plurality of rules. As shown, each row in the table, which represents a given rule, can include an abnormality, an anticipated root case, and at least one corrective action. The corrective action(s) associated with a given abnormality can be performed by a boiler (e.g., boiler 110A) or a component or subcomponent of the boiler and/or can include the transmittal of a notification or instructions to perform the corrective action(s). Depending on the desired system configuration, the computing device 120 and/or the boiler 110A can be configured to determine new rules and update the plurality of rules to include the new rule and/or to revise or update existing rules.

Some or all of the disclosed systems (e.g., system 100) and methods (e.g., method 200, method 300) can be performed by, and/or in conjunction with, the boiler 110A. As discussed below and referring to FIG. 5, the boiler 110A can comprise a central processing unit (CPU) 510 and boiler subcomponents 520. The CPU 510 can comprise one or more processor(s) 512, a graphical user interface 514 (e.g., provided via a display of the boiler 110A), transceiver 516, and/or database 518. The boiler subcomponents 520 can comprise boiler control 521, blower 522, pump(s) 523, sensor(s) 524, actuator(s) 525, and/or any other sensor, component, or subcomponent useful in a boiler. As described above, the processors(s) 512 can be used to determine an abnormality, to identify one or more subcomponents associated with the abnormality, and to determine one or more corrective actions associated with the abnormality and the one or more components, among other things. The transceiver 514 can receive the plurality of rules and/or historical data that are used to perform the aforementioned functionalities. Alternatively or in addition, the transceiver 518 can transmit or output updated sets of rules and/or the historical data or boiler data to be used to supplement the historical data (e.g., to supplement aggregated historical data for use with the same or other boilers).

Turning to the boiler subcomponents 520, the boiler control 521 can modulate many of the functions of the boiler 110A. For example, the boiler control 521 can be configured to set (e.g., via manual user input, automatically) the temperature setting to which water is to be heated by the boiler. The blower 522 can remove deposits from tubes of the boiler 110A (e.g., internal furnace tubes) during combustion, which can prevent plugging of the gas passes and help maintain boiler efficiency. The pump(s) 523 can push fluids (e.g., water) or heated gasses through the boiler 110A. The pump(s) 523 can force the fluids or heated gasses by introducing pressures. For example, the pumps can introduce pressure with impellers and force water through the system. The sensor(s) 524 can include temperature sensors configured to detect and/or monitor the temperate of the overall system, the temperature of the water at a given point within the boiler, the external temperature, and/or the temperature of various components. Alternatively or in addition, the sensor(s) 524 can include flow sensors configured to detect and/or monitor flow rates of a particular fluid, air pressure sensors configured to detect and/or monitor gaseous pressure, and/or oxygen sensors configured to detect and/or monitor oxygen levels of the overall system, at a given point within the boiler system, and/or at or within various components. The actuator(s) 525 can facilitate moving and/or controlling valve(s), shutter(s), and/or a bypass, among other things.

In this description, numerous specific details have been set forth. It is to be understood, however, that implementations of the disclosed technology can be practiced without these specific details. In other instances, well-known methods, structures, and techniques have not been shown in detail in order not to obscure an understanding of this description. References to "one embodiment," "an embodiment," "some examples," "example embodiment," "various examples," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for boiler regulation, the method comprising:
  receiving, at a transceiver of a computing device, boiler data from a boiler;
  comparing, by one or more processors of the computing device, the boiler data to a normal operating range that is based at least in part on stored historical data;
  detecting an abnormality in the boiler data by determining that less than a predetermined amount of the boiler data is inside the normal operating range;
  identifying, by the one or more processors, an anticipated root cause based on the boiler data and a selected rule of a plurality of rules, wherein each of the plurality of rules associates an abnormality with an anticipated root cause and at least one corrective action;
  identifying, by the one or more processors, the at least one corrective action associated with the abnormality based at least in part on the selected rule;
  outputting, by the one or more processors, instructions to perform the at least one corrective action;
  determining, by the one or more processors, that the at least one corrective action was not performed; and
  outputting, via the transceiver, a boiler override to force the boiler to shut off power to the at least one component associated with the at least one corrective action.

2. The method of claim 1, further comprising:
  receiving, at the transceiver, additional boiler data from the boiler;
  comparing, by the one or more processors, the additional boiler data to the normal operating range;
  responsive to less than the predetermined amount of the additional boiler data being inside the normal operating range, determining the abnormality has not been corrected; and
  responsive to at least the predetermined amount of the additional boiler data being inside the normal operating range, determining the abnormality has been corrected.

3. The method of claim 2, further comprising:
  responsive to determining the abnormality has been corrected, updating, by the one or more processors, the plurality of rules by increasing a weight value associated with the selected rule.

4. The method of claim 2, further comprising:
  responsive to determining the abnormality has not been corrected, updating, by the one or more processors, the plurality of rules by decreasing a weight value associated with the selected rule.

5. The method of claim 1, wherein each of the plurality of rules associates an abnormality with an anticipated root cause and a corrective action.

6. The method of claim 1, wherein detecting an abnormality further comprises:
  comparing the abnormality to the plurality of rules to determine an at least partial match between the abnormality and an abnormality of a rule of the plurality of rules, each rule having a respective weight value indicating a perceived reliability of the rule;
  determining a matching score for each at least partial match, the matching score being based at least in part on the respective weight value; and
  selecting the selected rule in response to determining the selected rule has a highest matching score.

7. The method of claim 1, wherein the instructions instruct the boiler to display, on a display, an indication of the abnormality, the anticipated root cause, and/or the at least one corrective action.

8. A method for boiler regulation, the method comprising:
  receiving, by one or more processors of a boiler, boiler data from one or more sensors or components of the boiler;
  comparing, by the one or more processors, the boiler data to one or more normal operating ranges that are each based on historical boiler data, each of the one or more normal operating ranges corresponding to a respective one or more sensors or components of the boiler;
  detecting an abnormality by determining that less than a predetermined amount of the boiler data is inside a respective normal operating range;
  identifying, by the one or more processors, an anticipated root cause based on the boiler data and a selected rule of a plurality of rules, wherein each of the plurality of rules associates an abnormality with an anticipated root cause and at least one corrective action;
  identifying, by the one or more processors, the at least one corrective action associated with the abnormality based at least in part on the selected rule;
  outputting, by the one or more processors, instructions to perform the at least one corrective action;
  transmitting, via the transceiver to a user device, a notification indicative of the at least one corrective action;
  determining, by the one or more processors, a status of the abnormality indicating whether the abnormality is corrected or uncorrected based at least in part on a response from the user device; and updating, by the one or more processors, the plurality of rules based on the status of the abnormality.

9. The method of claim 8, wherein each of the plurality of rules associates an abnormality with an anticipated root cause and a corrective action.

10. The method of claim 9, wherein each of the plurality of rules has a respective weight value indicating a perceived reliability of the rule.

11. The method of claim 10, further comprising:

responsive to determining the status of the abnormality is corrected, updating, by the one or more processors, the plurality of rules by increasing a weight value associated with the selected rule.

12. The method of claim 10, further comprising:

responsive to determining the status of the abnormality is uncorrected, updating, by the one or more processors, the plurality of rules by decreasing a weight value associated with the selected rule.

13. The method of claim 8, further comprising:

receiving, at a transceiver of the boiler, the plurality of rules from an external device.

14. The method of claim 8, further comprising:

displaying, via a graphical user interface of the boiler, an indication of the abnormality, the anticipated root cause, and/or the at least one corrective action.

15. The method of claim 8, wherein the historical boiler data comprises boiler data from a plurality of boilers associated with the boiler.

16. The method of claim 8, further comprising:

receiving, at a transceiver of the boiler, updates for one or more of the plurality of rules from an external device.

17. The method of claim 8, wherein at least a portion of the historical boiler data is stored locally.

18. A system for boiler regulation, the system comprising:

one or more processors;

a transceiver; and memory storing instructions that, when executed by the one or more processors, cause the system to:

receive boiler data from a boiler;

generate a normal operating range based at least in part on historical boiler data;

compare the boiler data to the normal operating range;

detect an abnormality in the boiler data by determining that more than a predetermined amount of the boiler data is outside the normal operating range;

identify at least one component of the boiler associated with the abnormality;

identify an anticipated root cause based on the boiler data and a selected rule of a plurality of rules, wherein each of the plurality of rules associates an abnormality with an anticipated root cause and at least one corrective action;

identify a corrective action associated with the selected rule;

output corrective instructions to perform the corrective action based on the selected rule;

compare additional boiler data from the boiler to the normal operating range;

responsive to less than the predetermined amount of the additional boiler data being inside the normal operating range, determine the abnormality has not been corrected; and responsive to at least the predetermined amount of the additional boiler data being inside the normal operating range, determine the abnormality has been corrected.

19. The system of claim 18, wherein the instructions, when executed by the one or more processors, further cause the system to:

receive the additional boiler data from the boiler.

20. The system of claim 19, wherein:

the corrective action is a first corrective action, the corrective instructions are first corrective instructions, and the instructions, when executed by the one or more processors, further cause the system to:

responsive to determining the abnormality has not been corrected, identify a second corrective action associated with the selected rule; and output second corrective instructions to perform the second corrective action based on the selected rule.

* * * * *